United States Patent
Stefan

(10) Patent No.: US 9,511,524 B2
(45) Date of Patent: Dec. 6, 2016

(54) GOLF BALL PARTING LINE CONFIGURATION AND MOLD

(75) Inventor: Ryan L. Stefan, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 608 days.

(21) Appl. No.: 12/969,452

(22) Filed: Dec. 15, 2010

(65) Prior Publication Data

US 2012/0157238 A1  Jun. 21, 2012

(51) Int. Cl.
| | |
|---|---|
| A63B 37/00 | (2006.01) |
| A63B 37/14 | (2006.01) |
| B29C 45/00 | (2006.01) |
| A63B 45/00 | (2006.01) |
| B29L 31/54 | (2006.01) |

(52) U.S. Cl.
CPC ........... *B29C 45/0025* (2013.01); *A63B 45/00* (2013.01); *A63B 37/0006* (2013.01); *B29C 2045/0034* (2013.01); *B29L 2031/546* (2013.01)

(58) Field of Classification Search
CPC .................... B29C 2045/0034; B29C 33/005; B29D 99/0042; A63B 37/0042; A63B 45/00; A63B 37/0006
USPC ................................................. 425/116, 408
See application file for complete search history.

(56) References Cited

U.S. PATENT DOCUMENTS

| | | | | |
|---|---|---|---|---|
| 4,653,758 | A  * | 3/1987 | Solheim ........................ | 473/377 |
| 5,688,193 | A | 11/1997 | Kasasima et al. | |
| 5,840,351 | A | 11/1998 | Inoue et al. | |
| 6,540,625 | B2 * | 4/2003 | Sajima ......................... | 473/383 |
| 6,595,876 | B2 | 7/2003 | Kasashima et al. | |
| 6,632,150 | B1 * | 10/2003 | Ogg ............................. | 473/378 |
| 6,685,455 | B2 * | 2/2004 | Ogg ............................. | 425/116 |
| 6,685,456 | B2 * | 2/2004 | Sajima ......................... | 425/116 |
| 6,719,647 | B2 | 4/2004 | Sajima | |
| 7,150,618 | B2 * | 12/2006 | Sajima et al. ................. | 425/116 |
| 7,387,504 | B2 | 6/2008 | Aoyama et al. | |
| 7,422,529 | B2 | 9/2008 | Aoyama et al. | |
| 7,431,670 | B2 | 10/2008 | Nardacci et al. | |
| 7,618,333 | B2 | 11/2009 | Nardacci et al. | |
| 2001/0027141 | A1 * | 10/2001 | Sajima ......................... | 473/378 |
| 2004/0041297 | A1 * | 3/2004 | Sajima et al. ................. | 264/161 |
| 2008/0064531 | A1 * | 3/2008 | Nardacci et al. ............. | 473/379 |
| 2008/0317892 | A1 | 12/2008 | Aoyama et al. | |
| 2009/0088273 | A1 * | 4/2009 | Nardacci et al. ............. | 473/379 |
| 2009/0102097 | A1 * | 4/2009 | Sajima ......................... | 264/299 |
| 2009/0209367 | A1 | 8/2009 | Stefan et al. | |

\* cited by examiner

*Primary Examiner* — John E Simms, Jr.
(74) *Attorney, Agent, or Firm* — Klarquist Sparkman, LLP

(57) ABSTRACT

A golf ball comprises two generally hemispherical portions joined together at a parting line and comprising dimples on respective outer surfaces thereof. The parting line comprises a repeating pattern of curved segments alternating with straight segments. The parting line crosses a geometric equator of the golf ball, and wherein the parting line intersects at least one dimple bordering the equator. A mold for producing a golf ball is also described.

17 Claims, 4 Drawing Sheets

GOLF BALL PARTING LINE CONFIGURATION AND MOLD

FIELD

The present application relates to golf, and in particular to a golf ball having a new parting line configuration and a mold for producing the new configuration.

DESCRIPTION OF RELATED ART

Golf balls are typically provided with dimpled surfaces because the "dimple effect" results in the desired turbulent flow separation earlier in ball flight, which produces less drag and yields longer distance shots.

Golf balls are typically produced by pressing together two hemispherical mold halves that form a dimple pattern in a suitable material, such as a synthetic resin or other material, contained in the mold. In conventional approaches, the resulting golf ball may have a noticeable break in the dimple pattern in the area of the parting line. In this case, the dimples are separated slightly to make room for the parting line, which results in a perceptible parting line between the halves of the ball. Efforts have been made to configure the parting line to minimize its effect on the dimple pattern.

There is still a need, however, to provide a high performance golf ball having a highly regular dimple pattern that provides consistent flight independent of the point on the ball at which it is struck.

SUMMARY

Described below are implementations of a golf ball having a new parting line configuration that addresses some of the problems associated with conventional golf balls, as well as suitable molds for producing the new golf ball.

According to a first implementation, a golf ball comprises two generally hemispherical portions joined together at a parting line and comprising dimples on respective outer surfaces thereof. The parting line comprises a repeating pattern of curved segments alternating with straight segments, wherein the parting line crosses the geometric equator of the golf ball, and the parting line intersects at least one dimple bordering the equator.

In some implementations, the parting line intersects exactly one dimple.

In some implementations, the straight segments of the parting line are spaced apart from the equator. The curved segments of the parting line may have their respective inflection points on a first side of the equator and the straight segments of the parting line may be on a second side of the equator opposite the first side. The repeating pattern may be repeated approximately every 72 degrees about each hemispherical portion.

The curved segments and the straight segments may be joined together at junctions each having a fillet radius. The dimples may have a substantially uniform diameter. The dimples may have a substantially uniform depth. The parting line may be bordered by about 30 dimples on each side.

The parting line may extend between dimples except at the point where the parting line intersects the at least one dimple. Each of the curved segments may cross the geometric equator of the golf ball. In some embodiments, none of the straight segments crosses the geometric equator of the golf ball.

According to another implementation, a golf ball comprises two generally hemispherical portions joined together at a parting line and comprising dimples on respective outer surfaces thereof, wherein the parting line is defined by a first function comprising a sine-like wave superposed with a second function to yield a repeating pattern of curved segments alternating with straight segments. The parting line may extend about the golf ball, intersecting a bordering dimple and remaining spaced apart from other bordering dimples.

The two generally hemispherical portions may be slightly asymmetrical relative to each other.

In some implementations, the parting line has a maximum peak-to-peak amplitude of 3°. In some implementations, the parting line has a maximum peak-to-peak amplitude of 1.5°.

In some implementations, the golf ball has a geometric equator, the geometric equator extends around the golf ball and the parting line oscillates about the equator as it extends around the golf ball.

According to one implementation, a golf ball mold comprises upper and lower sections each having projections for forming dimples in an outer surface of a golf ball, and mating surfaces on the upper and lower sections comprising curved segment forming surfaces alternating with straight segment forming surfaces. One of the mating surfaces can intersects with one of the projections so that a resulting segment of the parting line on the golf ball will intersect a dimple on the golf ball. All other mating surfaces can be spaced from the projections such that the remaining curved segments and remaining straight segments of the parting line to be formed on the golf ball do not intersect any of the dimples.

In some embodiments, the one of the mating surfaces that intersects with one of the projections corresponds to a straight segment forming surface.

These and other embodiments are described more fully below, with reference to the following drawings.

DETAILED DESCRIPTION

Figure 1:
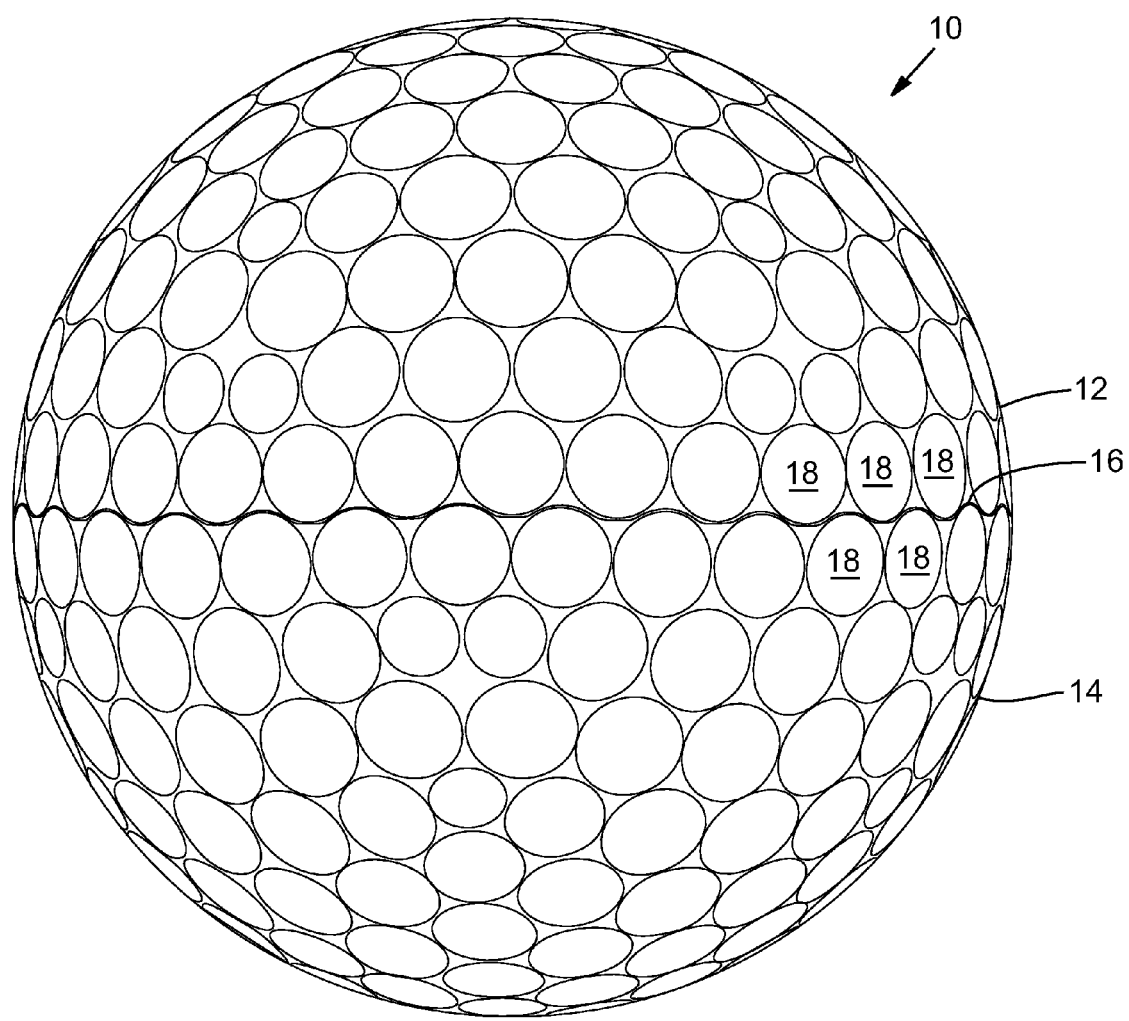
FIG. 1 is a perspective view of a golf ball having the new parting line.
Figure 2A:
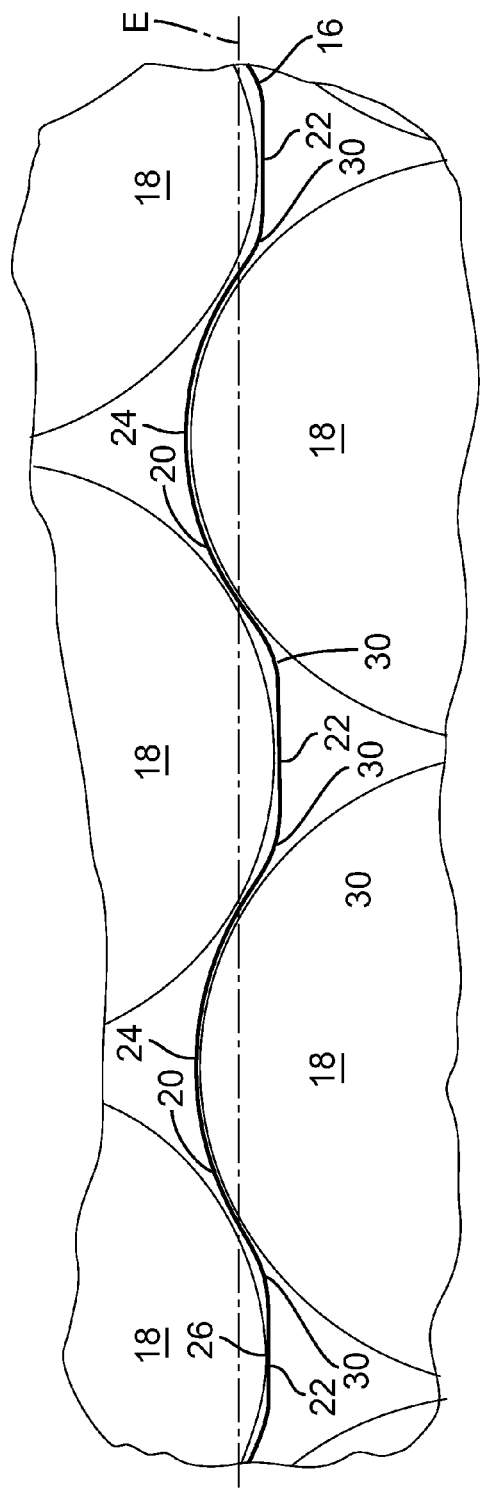
FIG. 2A is a magnified view of a section of the golf ball of FIG. 1 showing the parting line in greater detail.
Figure 2B:
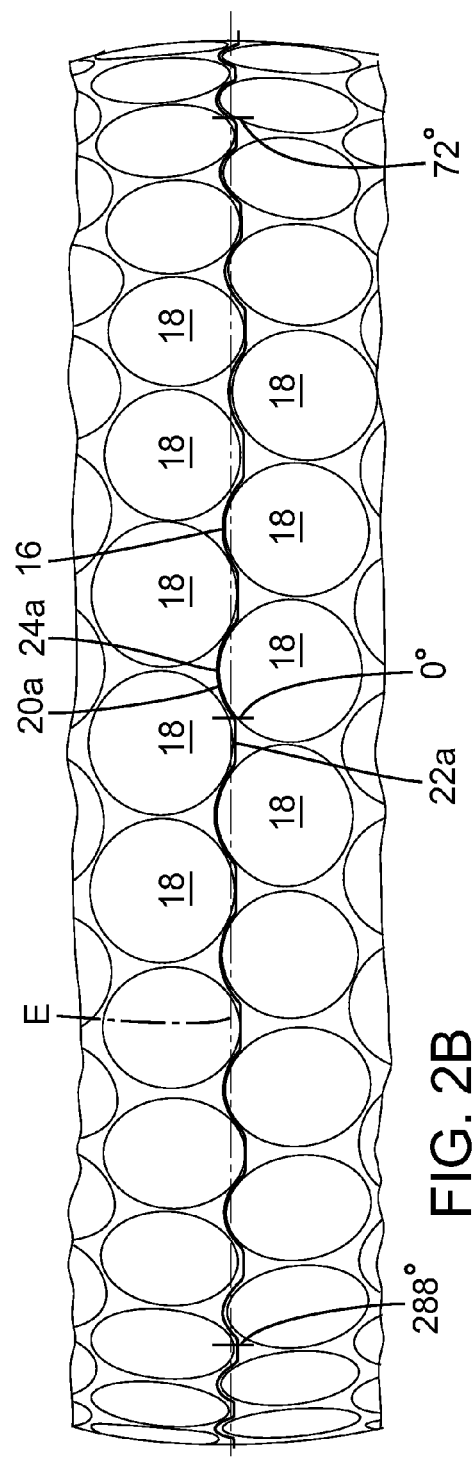
FIG. 2B is another magnified view of a section of the golf ball of FIG. 1 showing the parting line.

FIG. 1 is a perspective view of a new golf ball 10 formed from a first portion 12 and a second portion 14 that are joined together at a mold parting line 16. As shown in FIGS. 2A and 2B, the parting line 16 straddles the ball's equator E as it circumscribes the ball, with curved segments 20 alternating with straight segments 22. In general, the parting line 16 "interdigitates" or weaves between the two circumferential rows of dimples 18 that border or intersect the equator E. There are about 28-30 bordering dimples in each row that borders the equator E. In the implementation of FIG. 1, the equator is bordered by 60 dimples, i.e., 30 dimples on the "north" side of the equator and 30 dimples on the "south" side of the equator.

FIG. 2A shows an enlarged section of the golf ball 10 in the area of the parting line 16, illustrating that the straight segments 22 are entirely on one side of the equator E, and the curved segments 20 cross the equator E, but have their maxima/minima 24 on the side of the equator opposite the straight segments 22.

FIG. 2B is another enlarged section of the golf ball 10, which illustrates that the parting line 16 follows a repeating pattern that generally repeats n times about the circumference of the ball. In the illustrated implementation as shown in FIG. 2, the repeating pattern repeats five times about the circumference of the ball. Stated differently, the pattern is repeated every 72 degrees about the 360 degree circumference of the ball, or is said to have a period of 72 degrees. It should be noted that although the pattern is repeated as described, in preferred implementations there is only one point 26 on the parting line 16 that contacts one of the dimples 18, as described below in greater detail.

A representative instance of the repeating pattern is illustrated in FIG. 2B beginning at the point labeled 0° and extending to the point labeled 72°. As can be seen at the 0° point, the pattern starts at a junction between the end of a straight segment 22a and the beginning of a curved segment 20a, where the intersection is the closest point to the equator E on any of the straight segments 22. In the same way, the maxima/minima 24a of the curved segment 20a is spaced away from the equator E by a maximum amount. From 0° to 72°, the straight segments are progressively positioned farther from the equator E, and the curved segments have their maxima/minima positioned closer to the equator E. An identical instance of the pattern is shown between 288° (i.e., −72°) and 0°.

In the illustrated implementations, the curved segments 20 have a curvature that very closely matches the radius of the dimples. For example, for a dimple having a radius of about 2.1 mm, the radius of curvature of the curved segments 20 is about 2.2 mm. In the same example, the length of the straight segments 22 is about 1.06 mm. In the illustrated implementations, the parting line 16 "touches" or is coincident with one dimple at one point along its edge. In the illustrated implementation, the point 26 at which the parting line 16 is coincident with a dimple can be located about midway along one of the straight segments.

Thus, there is a slight departure in the repeating pattern, and in one instance, rather than approaching an adjacent one of the dimples 18, one of the straight segments 22 intersects the adjacent dimple at the point 26. In the illustrated implementation, the parting line 16 is moved to locate the point 26 correctly. In other embodiments, it would be possible to change the shape and/or size of one of the dimples to locate the point 26 correctly.

The point 26 can be a point of tangency between the curved periphery of the dimple and the intersecting straight section. In other implementations, the point 26 may be on a curved segment or at a fillet or other junction between a straight section and a curved section. In other implementations, the parting line 16 may be configured to touch more than one dimple, and preferably, about five dimples or fewer.

In some implementations, the repeating pattern of the parting line 16 can be defined as a superposition of two wave forms. The first wave form can have a relatively long wavelength, and the second wave form can have a relatively short wavelength. For example, the parting line configuration can be comprised of a superposition of a sine-like first wave and a second wave having a corresponding shape to yield the alternating straight and curved sections when added to the sine-like first wave. One purpose of the first waveform is to minimize disruption in large-scale features in the dimple pattern. One purpose of the second waveform is to allow the parting line to interdigitate between the dimples. The exact shape of the second waveform is determined by the particular dimple layout at the parting line.

As described, the parting line 16 crosses back and forth across the equator E as it follows the circumference of the golf ball. The parting line 16 can also be described in terms of its angular deviation from the equator E. In preferred implementations, the parting line 16 is within about a 3° latitude band on either side of the equator, and more preferably, within about a 1.5° band. Referring again to FIG. 2A, which shows a magnified view of a segment of the parting line 16, the junctions between the curved segments 20 and the straight segments 22 preferably have fillets 30 or are otherwise rounded to provide a smooth transition and avoid sharp edges.

Figure 3:
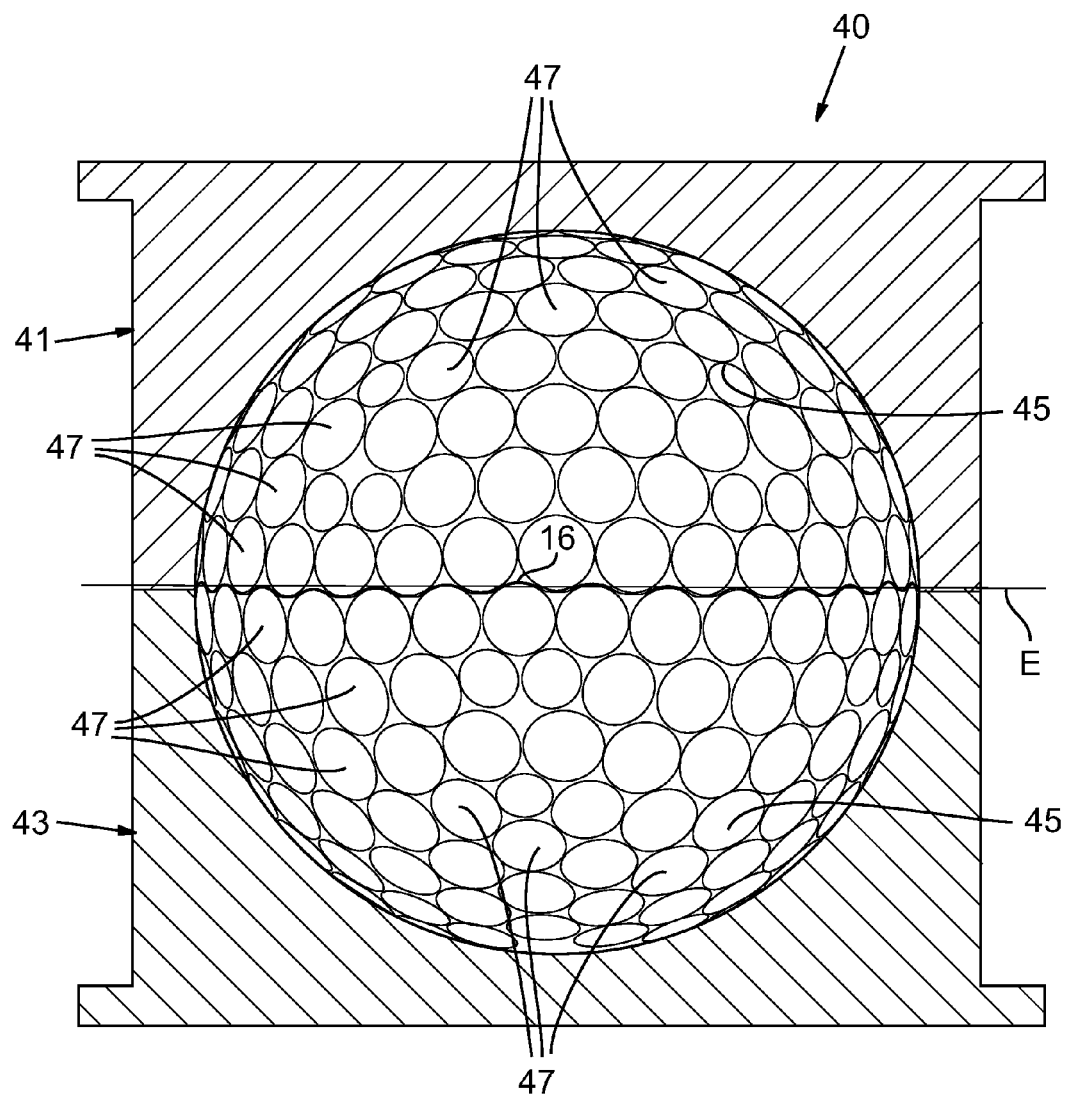
FIG. 3 is a sectional view in elevation of an exemplary mold apparatus for making the golf ball of FIG. 1.

FIG. 3 is a side elevation view, in section, of a representative mold 40 for making a golf ball as described above. The mold 40 comprises an upper mold section 41 and a lower mold section 43 that are joined together at the parting line 16 to define a cavity of a generally spherical shape and having an inner surface 45. The inner surface of the cavity has projections 47 corresponding to the dimples 18 on the golf ball that are positioned and sized according to the selected dimple pattern.

Figure 4:
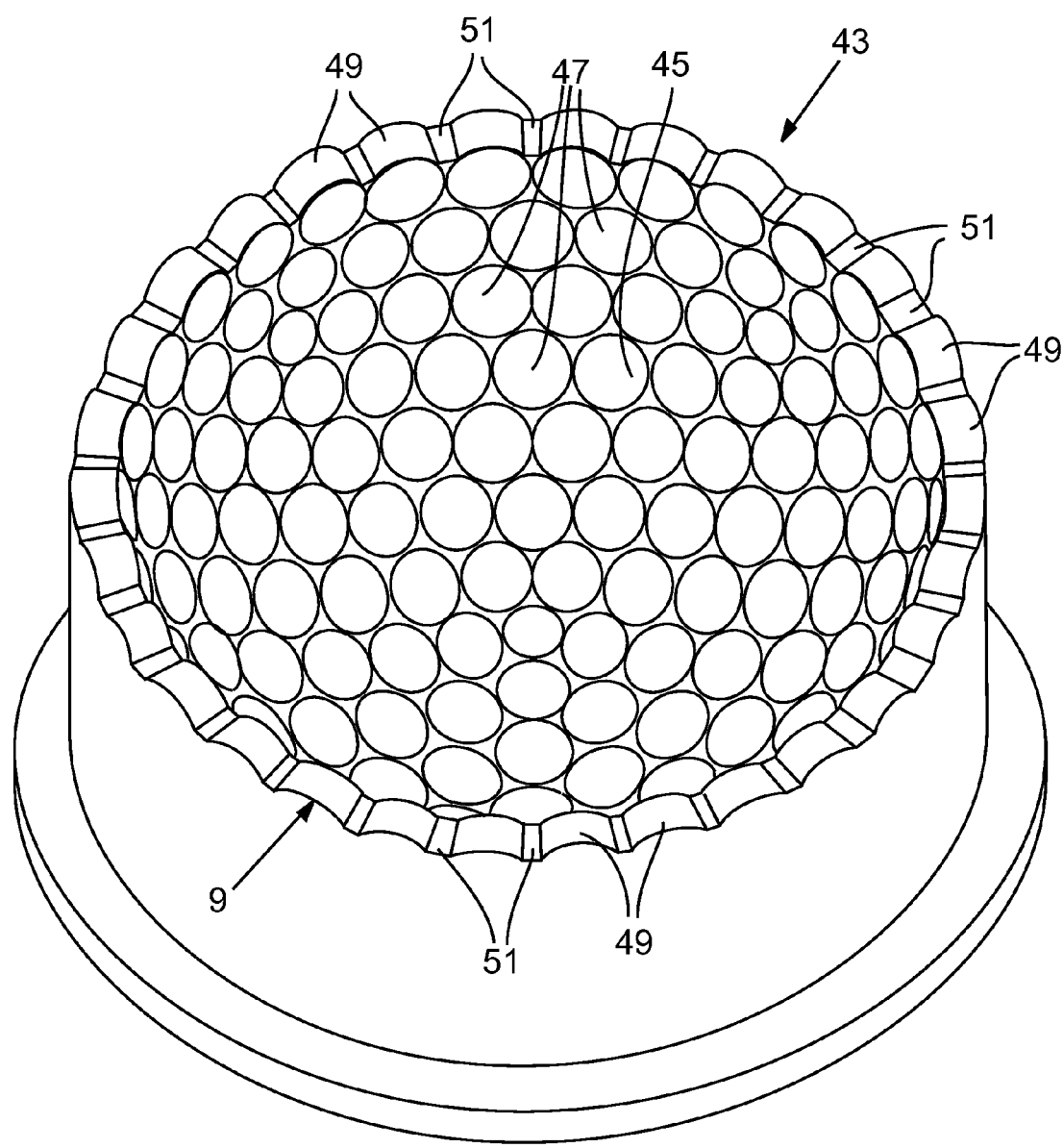
FIG. 4 is a perspective view of a lower portion of the mold apparatus of FIG. 4.

FIG. 4 is a perspective view of the lower mold section 43. The surfaces that meet to define the parting line 16 include the curved segment surfaces 49 and the alternating straight segment surfaces 51. In the illustrated implementation, there are 30 curved segment surfaces and 30 straight segment surfaces around the circumference of the mold. Although not specifically shown, the upper mold section 41 has a corresponding number and arrangement of curved segment surfaces and straight segment surfaces. In the upper mold section, the parting line contour is reversed, i.e., the curved segments are concave at locations where the corresponding bottom mold section has convex curved segments. This means that the top and bottom mold halves are not identical with regard to the parting line section.

Because the parting line is shaped to curve around most of the bordering dimples rather than to intersect with them, the parting line allows the dimples to be placed closer together than in a golf ball of a conventional design with a flat seam.

In view of the many possible embodiments to which the principles of the present disclosure can be applied, it should be recognized that the illustrated embodiments are only examples and should not be taken as limiting the scope of the following claims. We therefore claim all that comes within the scope and spirit of these claims.

What is claimed is:

1. A golf ball, comprising:
   two generally hemispherical portions joined together at a parting line and comprising dimples on respective outer surfaces thereof;
   the parting line comprising a repeating pattern of curved segments alternating with straight segments, wherein the parting line crosses the geometric equator of the golf ball and wherein the curved segments of the parting line have their respective maxima points on a first side of the equator and the straight segments of the parting line are on a second side of the equator opposite the first side;
   wherein the repeating pattern has a period of approximately 72°, such that along one period from 0° to 72° the straight segments are progressively positioned farther from the equator and then progressively positioned closer to the equator, and the maxima points of the curved segments are progressively positioned closer to the equator and then progressively positioned farther from the equator;

wherein each period of the parting line includes exactly five curved segments and exactly five straight segments; and wherein the parting line intersects at least one dimple bordering the equator.

2. The golf ball of claim 1, wherein the straight segments of the parting line are spaced apart from the equator.

3. The golf ball of claim 1, wherein the curved segments and the straight segments are joined together at junctions each having a fillet radius.

4. The golf ball of claim 1, wherein the parting line intersects exactly one dimple.

5. The golf ball of claim 1, wherein the dimples have a substantially uniform diameter.

6. The golf ball of claim 1, wherein the dimples have a substantially uniform depth.

7. The golf ball of claim 1, wherein each of the curved segments crosses the geometric equator of the golf ball.

8. A golf ball, comprising:

two generally hemispherical portions joined together at a parting line and comprising dimples on respective outer surfaces thereof;

the parting line being defined by a first function comprising a sine wave superposed with a second function to yield a repeating pattern of curved segments which have their respective maxima points on a first side of the equator and alternating with straight segments which are on a second side of the equator opposite the first side;

wherein the sine wave has a period of approximately 72°, such that along one period from 0° to 72° the straight segments are progressively positioned farther from the equator and then progressively positioned closer to the equator, and the maxima points of the curved segments are progressively positioned closer to the equator and then progressively positioned farther from the equator;

wherein each period of the parting line includes exactly five curved segments and exactly five straight segments; and wherein the parting line extends about the golf ball, intersecting a bordering dimple and remaining spaced apart from other bordering dimples.

9. The golf ball of claim 8, wherein the parting line has an angular deviation from the equator such that it falls within 3' latitude on either side of the equator.

10. The golf ball of claim 8, wherein the parting line has an angular deviation from the equator such that it falls within 1.5° latitude on either side of the equator.

11. The golf ball of claim 8, wherein the two generally hemispherical portions are asymmetrical relative to each other.

12. The golf ball of claim 8, wherein
the golf ball has a geometric equator, and wherein the geometric equator extends around the golf ball and the parting line oscillates about the equator as the parting line extends around the golf ball.

13. The golf ball of claim 8, wherein the curved segments and the straight segments are joined together at junctions each having a fillet radius.

14. The golf ball of claim 8, wherein the dimples have a substantially uniform diameter.

15. The golf ball of claim 8, wherein the dimples have a substantially uniform depth.

16. The golf ball of claim 8, wherein the parting line is bordered by about 30 dimples on each side.

17. The golf ball of claim 8, wherein the parting line is bounded by 1.5 degree latitude lines on either side of the equator.

* * * * *

UNITED STATES PATENT AND TRADEMARK OFFICE
CERTIFICATE OF CORRECTION

PATENT NO. : 9,511,524 B2
APPLICATION NO. : 12/969452
DATED : December 6, 2016
INVENTOR(S) : Stefan et al.

It is certified that error appears in the above-identified patent and that said Letters Patent is hereby corrected as shown below:

In the Claims

Column 6, Line 12, "3' on either side" should read —3° on either side—

Signed and Sealed this
Twenty-first Day of May, 2019

Andrei Iancu
*Director of the United States Patent and Trademark Office*